US009774953B2

(12) United States Patent
Nugent

(10) Patent No.: US 9,774,953 B2
(45) Date of Patent: *Sep. 26, 2017

(54) MICROPHONE ARRAY FOR ACOUSTIC SOURCE SEPARATION

(71) Applicant: University of Surrey, Surrey (GB)

(72) Inventor: David Nugent, Cambridge (GB)

(73) Assignee: University of Surrey, Guildford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/787,621

(22) PCT Filed: Apr. 29, 2014

(86) PCT No.: PCT/GB2014/051325
§ 371 (c)(1),
(2) Date: Oct. 28, 2015

(87) PCT Pub. No.: WO2014/177855
PCT Pub. Date: Nov. 6, 2014

(65) Prior Publication Data
US 2016/0080867 A1   Mar. 17, 2016

(30) Foreign Application Priority Data

Apr. 29, 2013  (GB) .................................. 1307694.8
Aug. 23, 2013  (GB) .................................. 1315134.5

(51) Int. Cl.
*H04R 3/00* (2006.01)
*H04R 5/027* (2006.01)
(Continued)

(52) U.S. Cl.
CPC ............ *H04R 5/027* (2013.01); *G10K 11/002* (2013.01); *H04M 1/03* (2013.01); *H04R 1/02* (2013.01);
(Continued)

(58) Field of Classification Search
CPC ........ H04R 3/005; H04R 1/406; H04R 5/027; H04R 2201/401; H04R 2201/405;
(Continued)

(56) References Cited

U.S. PATENT DOCUMENTS 7,058,184 B1   6/2006 Hickling
2006/0098533 A1   5/2006 Hickling
(Continued)

FOREIGN PATENT DOCUMENTS

CA   1236607 A   *   5/1988   .............. H04M 1/19
WO   2007/084121     7/2007
(Continued)

OTHER PUBLICATIONS

Benjamin et al., "The Native B-Format Microphone", AES Convention, Oct. 2005, pp. 1-4.
(Continued)

*Primary Examiner* — Alexander Jamal
(74) *Attorney, Agent, or Firm* — Wegman, Hessler & Vanderburg

(57) ABSTRACT

A system for directionally selective sound reception comprises an array of pressure sensors (120a, 120c) each arranged to output a pressure signal indicative of pressure, and a processor arranged to receive the pressure signals. The sensor array comprises a support (130) supporting the four sensors. Two of the sensors are mounted on one side of the support and at least a third sensor is supported on an opposite side of the support. The sound pressure difference measured between the first sensor and the second sensor caused by sound arriving at the array from a direction parallel to the support (130) is dependent on the distance between the first and second sensors and the nature of material in the space between the first and second sensors. The sound pressure difference measured between the first (Continued)

and third sensors caused by sound travelling perpendicular to the support is dependent on the distance between the first and third sensors. The nature of material in the space between the first and third sensors, and the spacings and the materials are selected such that the sound pressure differences are substantially equal.

17 Claims, 10 Drawing Sheets

(51) Int. Cl.
    *H04R 1/02*       (2006.01)
    *H04R 1/40*       (2006.01)
    *H04M 1/03*       (2006.01)
    *G10K 11/00*     (2006.01)
    *H04S 3/00*       (2006.01)
    *H04M 1/60*       (2006.01)

(52) U.S. Cl.
    CPC ............ *H04R 1/026* (2013.01); *H04R 1/406* (2013.01); *H04S 3/00* (2013.01); *H04M 1/6008* (2013.01); *H04R 2201/401* (2013.01); *H04R 2201/405* (2013.01); *H04R 2499/11* (2013.01); *H04S 2400/15* (2013.01)

(58) Field of Classification Search
    CPC .. H04R 1/04; H04R 2430/21; H04R 2430/23; H04R 2410/05; H04R 2430/20; H04R 1/1083; H04S 2400/15; H04S 7/30; G10L 2021/02166
    USPC ......... 381/92, 26, 71.7, 71.8, 94.7, 357, 361
    See application file for complete search history.

(56) References Cited

U.S. PATENT DOCUMENTS

| | | | |
|---|---|---|---|
| 2006/0140431 A1* | 6/2006 | Zurek | .................... H04R 3/005 381/355 |
| 2012/0051548 A1 | 3/2012 | Visser | |
| 2013/0315402 A1* | 11/2013 | Visser | .................... G10L 19/00 381/18 |
| 2014/0053650 A1* | 2/2014 | Hall | ........................ G01H 5/00 73/645 |

FOREIGN PATENT DOCUMENTS

| | | |
|---|---|---|
| WO | 2009/050487 | 4/2009 |
| WO | 2011/103488 | 8/2011 |
| WO | 2013/144609 | 10/2013 |
| WO | 2013/155251 | 10/2013 |

OTHER PUBLICATIONS

International Search Report for corresponding International Application No. PCT/GB2014/051325 dated Aug. 5, 2014.
Search Report for corresponding Application No. GB1315134.5 dated Mar. 7, 2014.
Search Report for corresponding Application No. GB1307694.8 dated Oct. 17, 2013.

* cited by examiner

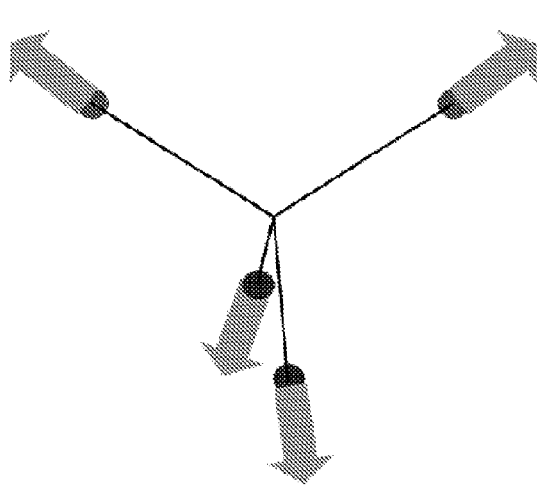
Fig. 3
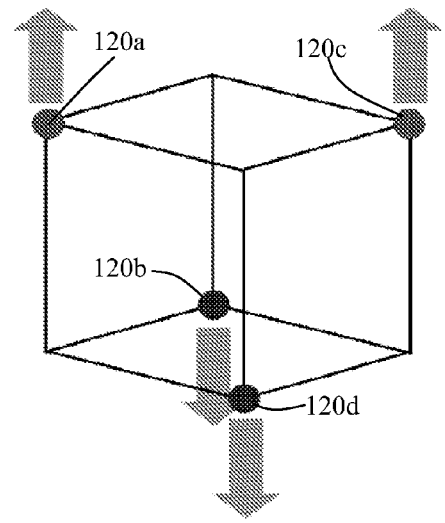
Fig. 4
Fig. 5
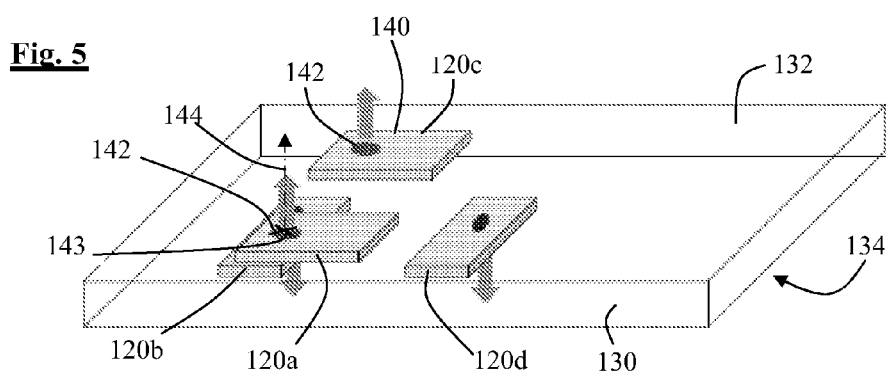

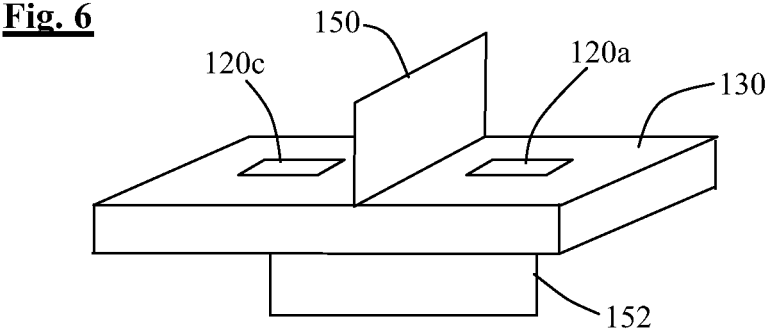
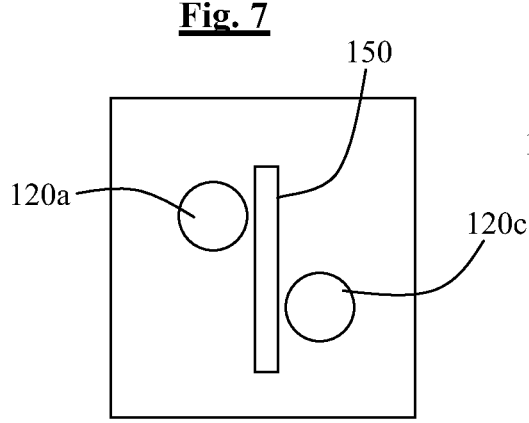 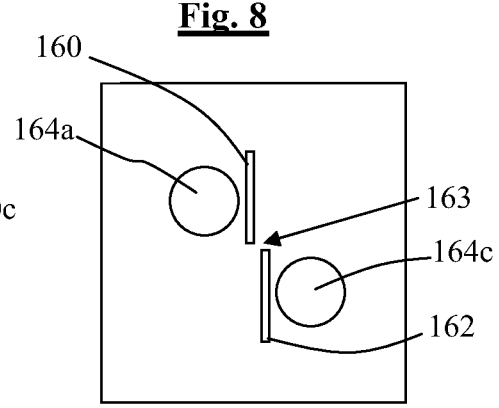
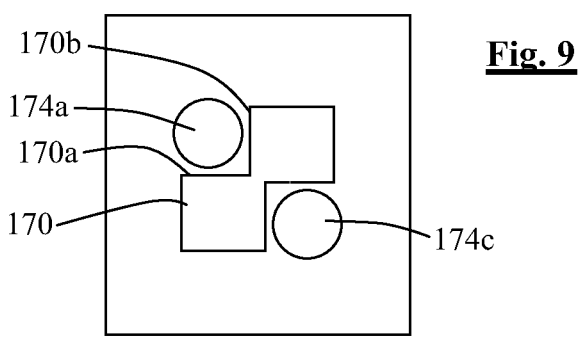

Cross section A-A'  Cross section B-B'

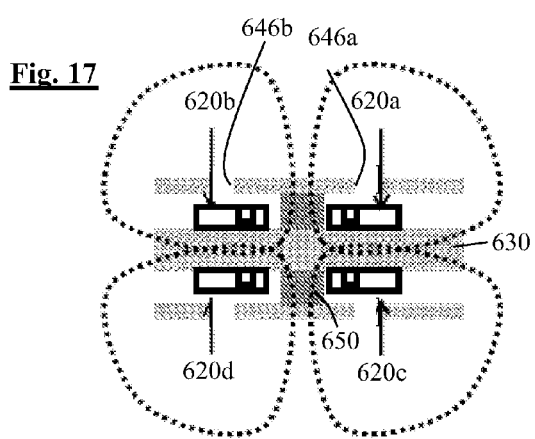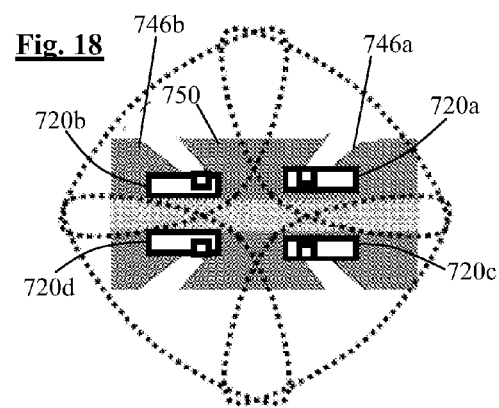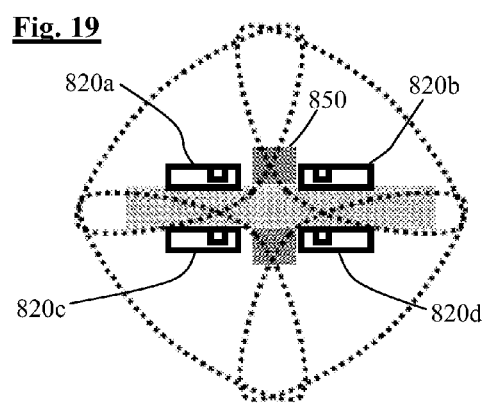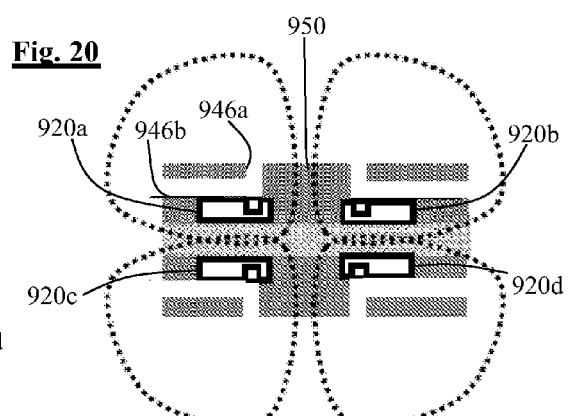

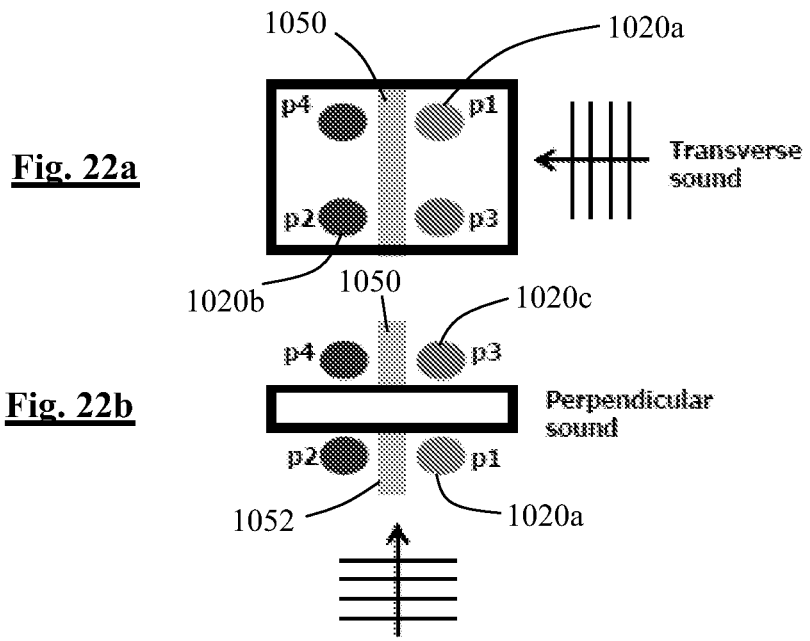
Fig. 22a
Fig. 22b
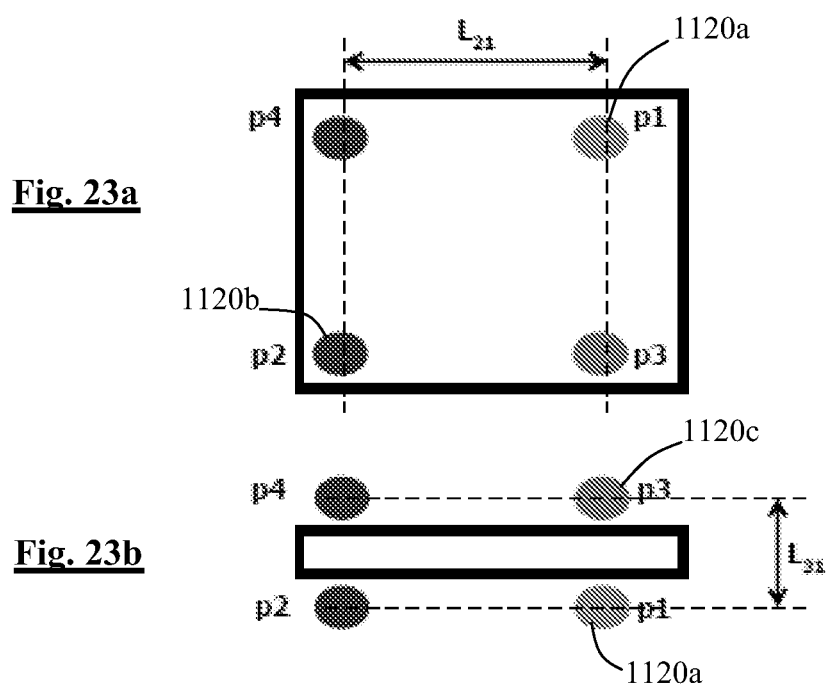
Fig. 23a
Fig. 23b

MICROPHONE ARRAY FOR ACOUSTIC SOURCE SEPARATION

CROSS-REFERENCE TO RELATED APPLICATIONS

This application claims the priority filing benefit of International PCT Application PCT/GB2014/051325 filed Apr. 29, 2014 and published under PCT 21(2) in the English language, Great Britain Patent Application No. 1307694.8 filed Apr. 29, 2013, and Great Britain Patent Application No. 1315134.5 filed Aug. 23, 2013. Each of the above listed applications is incorporated herein by reference.

FIELD OF THE INVENTION

The present invention relates to systems for the separation of a mixture of sounds from different sound sources, and in particular to the design of microphone arrays in such systems.

BACKGROUND TO THE INVENTION

The separation of convolutive mixtures aims to estimate the individual sound signals in the presence of other such signals in reverberant environments. As sound mixtures are almost always convolutive in enclosures, their separation is a useful pre-processing stage for speech recognition and speaker identification problems. Other direct application areas also exist such as in hearing aids, teleconferencing, multichannel audio and acoustical surveillance.

Our earlier patent application published as WO 2009/050487 discoses a system for separating a mixture of acoustic signals from a plurality of sources which comprises a sensor array comprising a plurality of pressure sensors and a processor arranged to receive signals from the sensors, and derive from them a series of sample values of directional pressure gradient, identify a plurality of frequency components of the signals, and define an associated direction for each frequency component. The system is then arranged to identify a subset of the frequency components with a source, thereby to define an accoustic signal for that source. Signals for several sources can be defined. In order to provide three dimensional source separation, a three dimensional array of sensors can be used, for example a tetrahedral array.

Our further earlier patent application no PCT/GB2013/050784 discloses a microphone array for a system similar to that of WO2009/050487, but in which the array is designed for ease of manufacture. This is achieved by forming the array of support means having two opposite sides and four sensors, with at least one of the sensors supported on each side of the support means, and the sensors facing in directions that are parallel to each other. Because the systems described in WO2009/050487 and PCT/GB2013/050784 work by measuring pressure gradient within the sound wave between different microphones in the array, the arrays described in WO2009/050487 and PCT/GB2013/050784 were designed to allow sound to travel between the microphones as easily as possible, so as to interfere as little as possible with the propagation of the sound wave past the array.

SUMMARY TO THE INVENTION

The formation of acoustic pressure gradients, and thereby ability of the algorithm of PCT/GB2013/050784 to localise sounds, can be manipulated by inserting acoustic barriers or other objects between microphone capsules that are located either in the same plane or in different planes. Such objects have the effect of modifying the directional sensitivity of each microphone capsule; this is interpreted by the algorithm as modified pressure gradients and a correspondingly different incident angle is deduced.

Accordingly the present invention provides a system for directionally selective sound reception comprising an array of pressure sensors each arranged to output a pressure signal indicative of pressure, and processing means arranged to receive the pressure signals, the sensor array comprising support means supporting the sensors, a first one and a second one of the sensors being mounted on one side of the support means and at least a third sensor being supported on an opposite side of the support means. The system may further comprise processing means arranged to determine the direction from which a sound component arrives at the array. The component may be a frequency component. The processing means be arranged, in determining the direction, to determine at least one pressure difference measured between two of the sensors. This may be a sound pressure difference, and may be an instantaneous sound pressure difference.

The spacing of the sensors, and the materials located between the sensors may be selected so that the error in the measured direction of the sound component is no more than 45°, preferably no more than 30°. This may be for sound coming from any direction over a 360° range, or it may be for sound coming from any direction in three dimensions.

The sound pressure difference measured between the first sensor and the second sensor caused by sound arriving at the array from a first predetermined direction, for example the direction parallel to the support means, may be dependent on the distance between the first and second sensors or the nature of the material between the first and second sensors, or both. The sound pressure difference measured between the first and third sensors caused by sound travelling in a second predetermined direction, which may be the direction perpendicular to the support means, may be dependent on the distance between the first and third sensors, or the nature of material in the space between the first and second sensors, or both. The spacings, or the materials, or both, may be selected such that the sound pressure differences are substantially equal. The spacing of the sensors, or the materials located between the sensors, or both, may be selected so that the sound pressure differences are substantially equal. This may be the case for sound coming from any direction over a 360° range, or it may be for sound coming from any direction in three dimensions.

The present invention further provides a system for directionally selective sound reception comprising an array of pressure sensors each arranged to output a pressure signal indicative of pressure, and processing means arranged to receive the pressure signals, the sensor array comprising support means supporting the four sensors, a first one and a second one of the sensors being mounted on one side of the support means and at least a third sensor being supported on an opposite side of the support means, wherein the spacing between the first and second sensors, which may be in the direction parallel to the plane of the substrate, is greater than the distance between the first and third sensors, which may be in the direction perpendicular to the plane of the substrate.

For example the spacing between the first and second sensors may be at least 10%, or at least 25%, or at least 50%, or at least 100% greater than that between the first and third sensors.

The present invention further provides a system for directionally selective sound reception comprising an array of pressure sensors each arranged to output a pressure signal indicative of pressure, and processing means arranged to receive the pressure signals, the sensor array comprising support means supporting the four sensors, a first one and a second one of the sensors being mounted on one side of the support means and at least a third sensor being supported on an opposite side of the support means, wherein the sound pressure difference measured between the first sensor and the second sensor caused by sound arriving at the array from a direction parallel to the support means is dependent on the distance between the first and second sensors and the sound pressure difference measured between the first and third sensors caused by sound travelling perpendicular to the support means, and the attenuation of sound travelling from the first sensor to the third sensor is dependent on the distance between the first and third sensors and the nature of material in the space between the first and second sensors, and the spacings and the materials are selected such that the sound pressure differences are substantially equal.

As the sound pressure differences are frequency dependent, the sound pressure differences may be those at at least one audible frequency. The audible frequency range is from 20 Hz to 20 kHz. For example frequency may be 1000 Hz, or 256 Hz. Substantially equal may be that one of the sound pressure differences is no more than 50%, or no more than 25%, or no more than 10%, or no more than 5% higher than the other.

The present invention further provides a system for directionally selective sound reception comprising an array of pressure sensors each arranged to output a pressure signal indicative of pressure, and processing means arranged to receive the pressure signals, the sensor array comprising support means supporting the four sensors, a first one and a second one of the sensors being mounted on one side of the support means and at least a third sensor being supported on an opposite side of the support means, wherein the acoustic attenuation of sound travelling from the first sensor to the second sensor is substantially the same as the acoustic attenuation of sound travelling from the first sensor to the third sensor. Substantially equal may be that one of the attenuations is no more than 50%, or no more than 25%, or no more than 10%, or no more than 5% higher than the other.

The attenuations, or pressure differences, may be achieved by having a greater spacing between the first and second sensors than the first and third sensors, in which case the material between the first and second sensors is typically air, or by providing a barrier between the first and third sensors, typically a solid barrier, which will generally have a higher density, and acoustic impedance, than air and hence provide more attenuation, or by both one or more barriers and greater spacing.

The spacing and/or the barrier or barriers may therefore be arranged at least partially to compensate for the directional asymmetry produced by the presence of the support means.

The system may comprise processing means arranged to receive pressure signals from each of the sensors.

The present invention further provides a system for directionally selective sound reception comprising an array of pressure sensors each arranged to output a pressure signal indicative of pressure, and processing means arranged to receive the pressure signals, the sensor array comprising support means having two opposite sides and four sensors, at least two of sensors being supported on one side of the support means, and a barrier located between said two of the sensors.

The present invention also provides a system for directionally selective sound reception comprising an array of pressure sensors each arranged to output a pressure signal indicative of pressure, and processing means arranged to receive the pressure signals, the sensor array comprising support means supporting the four sensors, at least two of sensors being arranged to face in one direction, the system including a barrier located between said two of the sensors. The barrier may comprise part of the support means, or may be a separate component.

In each case, the processing mean may be arranged to derive from the pressure signals a series of sample values of directional pressure gradient. The processing means may be arranged to identify a plurality of frequency components of the signals, and define an associated direction for each frequency component.

The processing means may be arranged to identify a plurality of frequency components of the signals, identify at least one source direction, and identify at least one of the components as coming from the source direction.

The barrier may be mounted on the support means. The support means may be planar. The barrier may be planar and/or may have two parallel sides. The barrier, or the sides of the barrier, may extend perpendicular to the plane, or the sides, of the support means.

Two of the sensors may be supported on one of the sides of the support means and two of the sensors may be supported on the other of the sides. In this case there may be two barriers, each located between the two sensors on a respective side of the support means. The barrier, or each of the barriers, may have two perpendicular surfaces facing each of the two sensors that it is located between. These surfaces may each be perpendicular to the plane of the surface of the support on which the sensor is mounted. This can result in one of, or each of, the microphones being located in a cavity defined between three perpendicular surfaces.

Alternatively one of the sensors may be supported on one of the sides and three of the sensors may be supported on the other of the sides. In this case the barrier may be located between at least two of said three sensors.

Each of the sensors may have a sensing centre point. This may be the point at which the sensor nominally measures the pressure. It may be the centre of a region over which the sensor is arranged to sense pressure. For example it may be the centre of a diaphragm of the sensor. The sensing centre points of the four sensors may be arranged such that each of them is equidistant from each of the other three. The sensing centre points may be arranged so that they lie at the corners of a regular tetrahedron.

The height of the barrier above the surface of the support needs to be sufficient to have an appreciable effect. For example a part of the barrier may be located on a straight line between the sensing centre points of two of the sensors. This may be the case even if the barrier is not mounted on the support means. For example the system may include a housing in which the array is housed. The barrier may be mounted on the housing. There may be a gap between the barrier and the support means.

Regardless of where the barrier is mounted, the housing may have one or more apertures though it each associated with at least one of the sensors. Preferably there are four apertures, one associated with each of the sensors. The apertures may be of any shape, and may be all of the same shape, or may be of different shapes. The apertures may be spaced apart by a greater distance than the sensing centre points of the sensors. Where the sensors, or the sensing centre points of the sensors, are each equidistant from the other three, and therefore also equidistant from a centre point, the apertures may be arranged so that each of them lies on a line from the centre point extending outwards through the sensor, or the sensing centre point. The apertures may also each be equidistant from the other three.

The attenuation of sounds in the direction away from the array centre point, the 'preferred' direction, is preferably at least 1 dB lower in the preferred direction than in any perpendicular direction, and more preferable for it to be at least 2 dB lower, or even 3 dB lower. This is preferably for all sounds in the acoustic range, but may be just at one frequency, for example 250 Hz.

The system may be arranged to separate a mixture of acoustic signals from a plurality of sources, or it may be a directional listening system arranged to receive sounds only from one or more selected directions.

Each of the sensors may have a central axis. The central axis may be an axis about which the sensor has at least a degree of rotational symmetry. The central axis may be a line through the centre of the sensor, and may extend in a direction in which the sensor faces. The sensor may have a rear side which is closest to the support means and a front side, opposite the rear side, which faces in said direction. The two, or three, sensors on one side of the support means may be parallel to each other. For example their central axes may be parallel to each other, or they may face in the same direction. Where there are two sensors on each of the surfaces, the two sensors on the other side of the support means may also be parallel to each other.

The processing means may be arranged to define a series of time windows; and for each time window:
 a) generate from the pressure signals a series of sample values of measured directional pressure gradient;
 b) identify different frequency components of the pressure signals;
 c) for each frequency component define an associated direction;
 d) from the frequency components and their associated directions generate a separated signal for one of the sources.

The processing means may be arrange to define from the pressure signals a series of values of a pressure function. A directionality function may be applied to the pressure function to generate the separated signal for the source. For example, the pressure function may be, or be derived from, one or more of the pressure signals, which may be generated from one or more omnidirectional pressure sensors, or the pressure function may be, or be derived from, one or more pressure gradients.

The separated signal may be an electrical signal. The separated signal may define an associated acoustic signal. The separated signal may be used to generate a corresponding acoustic signal.

The associated direction may be determined from the pressure gradient sample values.

The directions of the frequency components may be combined to form a probability distribution from which the directionality function is obtained.

The directionality function may be obtained by modelling the probability distribution so as to include a set of source components each comprising a probability distribution from a single source.

The probability distribution may be modelled so as also to include a uniform density component.

The source components may be estimated numerically from the measured intensity vector direction distribution.

Each of the source components may have a beamwidth and a direction, each of which may be selected from a set of discrete possible values.

The directionality function may define a weighting factor which varies as a function of direction, and which is applied to each frequency component of the omnidirectional pressure signal depending on the direction associated with that frequency.

The system may further comprise, in any combination, any one or more features of the preferred embodiments of the invention which will now be described by way of example only with reference to the accompanying drawings.

BRIEF DESCRIPTION OF THE DRAWINGS

FIG. 3 is a schematic diagram of the orientation of microphones in a known microphone array;

FIG. 4 is a schematic diagram of the orientation of the microphones in the array of FIG. 2;

FIG. 5 is a perspective view of the microphone array of FIGS. 2 and 4;

FIG. 6 is a diagram of the array of FIG. 5 showing barriers which are not shown in FIG. 5;

FIG. 7 is a diagram of a microphone array according to a second embodiment of the invention;

FIG. 8 is a diagram of a microphone array according to a third embodiment of the invention;

FIG. 9 is a diagram of a microphone array according to a fourth embodiment of the invention;

FIG. 11a is an enlargement of part of FIG. 10a;

FIG. 17 is a section through an array according to a further embodiment of the invention;

FIG. 18 is a section through an array according to a further embodiment of the invention;

FIG. 19 is a section through an array according to a further embodiment of the invention;

FIG. 20 is a section through an array according to a further embodiment of the invention;

FIG. 22a is a schematic front view of a microphone array corresponding to that of FIG. 6;

FIG. 22b is a schematic plan view of the microphone array of FIG. 22a;

FIG. 23a is a schematic front view of a microphone array according to a further embodiment of the invention; and FIG. 23b is a schematic plan view of the microphone array of FIG. 23a.

DESCRIPTION OF THE PREFERRED EMBODIMENTS

Figure 1:
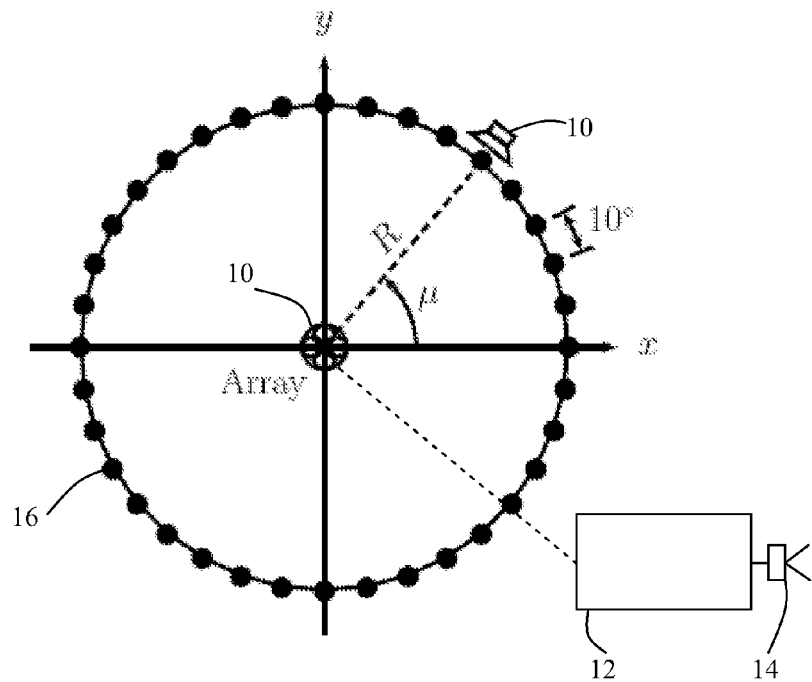
FIG. 1 is a schematic diagram of a system according to an embodiment of the invention.

Referring to FIG. 1, an audio source separation system according to a first embodiment of the invention comprises a microphone array 10, a processing system, in this case a personal computer 12, arranged to receive audio signals from the microphone array and process them, and a speaker system 14 arranged to generate sounds based on the processed audio signals. The microphone array 10 is located at the centre of a circle of 36 nominal source positions 16. Sound sources 18 can be placed at any of these positions and the system is arranged to separate the sounds from each of the source positions 16. Clearly in a practical system the sound source positions could be spaced apart in a variety of ways.

Figure 2:
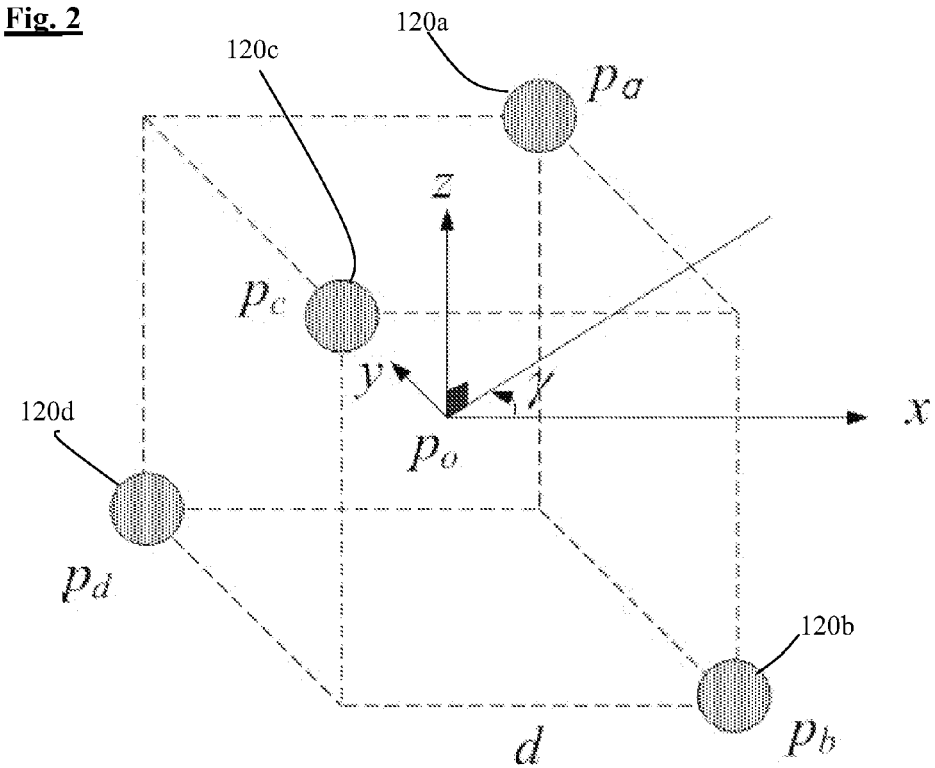
FIG. 2 is a diagram of a microphone array forming part of the system of FIG. 1.

Referring to FIG. 2, the microphone array 10 comprises four microphones 120a, 120b, 120c, 120d placed at positions which correspond to the four non-adjacent corners of a cube of side length d, and therefore each equidistant from the other three. This geometry forms a tetrahedral microphone array.

Let us consider a plane wave arriving from the direction $\gamma(\omega,t)$ on the horizontal plane with respect to the center of the cube. If the pressure at the centre due to this plane wave is $p_o(\omega, t)$, then the pressure signals $p_a, p_b, p_c, p_d$ recorded by the four microphones 120a, 120b, 120c, 120d can be written as, $$p_a(\omega,t)=p_o(\omega,t)e^{jkd\sqrt{2}/2\,\cos(\pi/4-\gamma(\omega,t))}, \quad (1)$$

$$p_b(\omega,t)=p_o(\omega,t)e^{jkd\sqrt{2}/2\,\sin(\pi/4-\gamma(\omega,t))}, \quad (2)$$

$$p_c(\omega,t)=p_o(\omega,t)e^{-jkd\sqrt{2}/2\,\cos(\pi/4-\gamma(\omega,t))}, \quad (3)$$

$$p_d(\omega,t)=p_o(\omega,t)e^{-jkd\sqrt{2}/2\,\sin(\pi/4-\gamma(\omega,t))}, \quad (4)$$

where k is the wave number related to the wavelength $\lambda$ as $k=2\pi/\lambda$, j is the imaginary unit and d is the length of the one side of the cube. Using these four pressure signals, B-format signals, $p_W$, $p_X$ and $p_Y$ can be obtained as:

$$p_W=0.5(p_a+p_b+p_c+p_d),$$

$$p_X=p_a+p_b-p_c-p_d \text{ and}$$

$$p_Y=p_a-p_b-p_c+p_d.$$

If, $kd\ll1$, ie when the microphones are positioned close to each other in comparison to the wavelength, it can be shown by using the relations $\cos(kd\cos\gamma)\approx1$, $\cos(kd\sin\gamma)\approx1$, $\sin(kd\cos\gamma)\approx kd\cos\gamma$ and $\sin(kd\sin\gamma)\approx kd\sin\gamma$ that, $$p_W(\omega,t)=2p_o(\omega,t), \quad (5)$$

$$p_X(\omega,t)=j2p_o(\omega,t)kd\cos(\gamma(\omega,t)), \quad (6)$$

$$p_Y(\omega,t)=j2p_o(\omega,t)kd\sin(\gamma(\omega,t)) \quad (7)$$

The acoustic particle velocity, $v(r,w,t)$, instantaneous intensity, and direction of the intensity vector, $\gamma(\omega,t)$ can be obtained from $p_x$, $p_y$, and $p_w$.

Since the microphones 120a, 120b, 120c, 120d in the array are closely spaced, plane wave assumption can safely be made for incident waves and their directions can be calculated. If simultaneously active sound signals do not overlap directionally in short time-frequency windows, the directions of the intensity vectors correspond to those of the sound sources randomly shifted by major reflections.

It will be appreciated that the B-format signals, and the calculations described above, are based on the instantaneous difference in pressure between respective pairs of the microphones, and therefore the measured instantaneous pressure gradients in the respective directions between those pairs of microphones.

The exhaustive separation of the sources by decomposing the sound field into plane waves using intensity vector directions will now be described. This essentially comprises taking N possible directions, and identifying from which of those possible directions the sound is coming, which indicates the likely positions of the sources.

In a short time-frequency window, the pressure signal $p_W(\omega,t)$ can be written as the sum of pressure waves arriving from all directions, independent of the number of sound sources. Then, a crude approximation of the plane wave $s(\mu,\omega,t)$ arriving from direction $\mu$ can be obtained by spatial filtering $p_W(\omega,t)$ as, $$\tilde{s}(\mu,\omega,t)=p_W(\omega,t)f(\gamma(\omega,t);\mu,\kappa), \quad (8)$$

where $f(\gamma(\omega,t);\mu,\kappa)$ is the directional filter defined by the von Mises function, which is the circular equivalent of the Gaussian function.

Spatial filtering involves, for each possible source direction or 'look direction' multiplying each frequency component by a factor which varies (as defined by the filter) with the difference between the look direction and the direction from which the frequency component is detected as coming.

For exhaustive separation, ie separation of the mixture between a total set of N possible source directions, N directional filters are used with look directions $\mu$ varied by $2\pi/N$ intervals. Then, the spatial filtering yields a row vector $\tilde{s}$ of size N for each time-frequency component:

$$\tilde{s}(\omega, t) = \begin{bmatrix} f_1(\omega,t) & 0 & \cdots & 0 \\ 0 & f_2(\omega,t) & \cdots & 0 \\ \vdots & \vdots & \ddots & 0 \\ 0 & 0 & \cdots & f_N(\omega,t) \end{bmatrix} \begin{bmatrix} p_W(\omega,t) \\ p_W(\omega,t) \\ \vdots \\ p_W(\omega,t) \end{bmatrix} \quad (9)$$

where $f_i(\omega, t) = f(\gamma(\omega,t); \mu_i, \kappa)$.

The elements of this vector can be considered as the proportion of the frequency component that is detected as coming from each of the N possible source directions.

This method implies block-based processing, such as with the overlap-add technique. The recorded signals are windowed, ie divided into time periods or windows of equal length, and converted into frequency domain after which each sample is processed as in (9). These are then converted back into time-domain, windowed with a matching window function, overlapped and added to remove block effects.

Due to the 3D symmetry of the tetrahedral microphone array of FIG. 2, the pressure gradient along the z axis, $p_Z(\omega,t)$ can also be calculated and used for estimating both the horizontal and the vertical directions of the intensity vectors.

The active intensity in 3D can be written as:

$$I(\omega, t) = \frac{1}{\rho_0 c}[\text{Re}\{p_W^*(\omega,t)p_X(\omega,t)\}u_x + \text{Re}\{p_W^*(\omega,t)p_Y(\omega,t)\}u_y + \text{Re}\{p_W^*(\omega,t)p_Z(\omega,t)\}u_z] \quad (10)$$

Then, the horizontal and vertical directions of the intensity vector, $\mu(\omega,t)$ and $\nu(\omega, t)$, respectively, can be obtained by $$\mu(\omega, t) = \arctan\left[\frac{\text{Re}\{p_W^*(\omega, t)p_Y(\omega, t)\}}{\text{Re}\{p_W^*(\omega, t)p_X(\omega, t)\}}\right], \quad (11)$$

$$v(\omega, t) = \arctan\left[\frac{\text{Re}\{p_W^*(\omega, t)p_Z(\omega, t)\}}{[(\text{Re}\{p_W^*(\omega, t)p_X(\omega, t)\})^2 + (\text{Re}\{p_W^*(\omega, t)p_Y(\omega, t)\})^2]^{1/2}}\right] \quad (12)$$

The extension of the von Mises distribution to 3D case yields a Fisher distribution which is defined as $$f(\theta, \phi; \mu, v, \kappa) = \frac{\kappa}{4\pi\sinh\kappa}\exp[\kappa\{\cos\phi\cos v + \sin\phi\sin v\cos(\theta - \mu)\}]\sin\phi, \quad (13)$$

where $0<\theta<2\pi$ and $0<\phi<\pi$ are the horizontal and vertical spherical polar coordinates and $\kappa$ is the concentration parameter. This distribution is also known as von Mises-Fisher distribution. For $\phi=\pi/2$ (on the horizontal plane), this distribution reduces to the simple von Mises distribution.

For separation of sources in 3D, the directivity function is obtained by using this function, which then enables spatial filtering considering both the horizontal and vertical intensity vector directions.

Once the spatial filtering has been performed, sound received from one or more chosen directions can be selected and, for example, reproduced through the speaker system 14.

Even though the microphones of the array are of the type which is referred to as omnidirectional, they are generally constructed in a way such that they can be considered to face in a particular direction. Typically each microphone has a sensing surface, generally being the surface of a diaphragm, which may be flat, and may be circular or square in shape, and therefore has a geometrical centre. This forms the centre point of the sensor, which is the point at which it is nominally measuring the pressure. A line from that centre point and perpendicular to the sensing surface can be considered as the central axis of the microphone and extends in the direction in which the microphone is facing. Referring to FIG. 3, in a known tetrahedral microphone array, the microphones are arranged such that each of them faces away from a common central point which is the centre of the tetrahedron. However, referring to FIG. 4, in this embodiment the four microphones 120a, 120b, 120c, 120d of the array are arranged in two pairs. In each pair, the two microphones making up the pair are arranged in the same orientation as each other, so that they both face in the same direction, as indicated by the arrows in FIG. 4, which is perpendicular to an imaginary line between their two centre points. The two pairs of microphones face in opposite directions, each pair facing generally away from the other pair. The positions of the microphones 120a, 120b, 120c, 120d in the array relative to each other is the same as in a tetrahedral array, with the centre point of each microphone being the same distance from the centre points of each of the other three.

Referring to FIG. 5, the microphone array 120 is constructed as a planar support member 130 having two opposite support surfaces 132, 134 on opposite sides. As the support member 130 is flat and regular, the two surfaces 132, 134 are parallel to each other. One pair of microphones 120a, 120c is mounted on one of the surfaces 132 and the other pair of microphones 120b, 120d is mounted on the other of the surfaces 134. Each of the microphones 120a, 120b, 120c, 120d is a MEMS microphone and comprises a body 140 with a diaphragm 142 formed on it. The body has a rear surface which is adhered directly to the support member 130 and a front surface in which the diaphragm 142 is formed. The diaphragm 142 is circular and so has a centre point 143 at its geometrical centre as described above. The diaphragm also has rotational symmetry about a central axis 144 which extends through the centre point and perpendicular to the plane of the diaphragm. The central axis extends in the direction in which the microphone faces. The first pair of microphones 120a, 120c are mounted so that they both face in the same direction which is perpendicular to the plane of the support member 130, and the second pair of microphones 120b, 120d are mounted so that they face in the opposite direction. The spacing between the diaphragm centres of the two microphones in the first pair is the same as the spacing between the diaphragm centres of the two microphones in the second pair, and is selected so that each of the microphone centre points is equidistant from the other three.

Referring to FIG. 6, a barrier 150 is provided between the two sensors 120c, 120d on one side of the support member 130, and a further barrier 152 is provided between the two sensors 120a, 120c on the other side of the support member 130. Each of the barriers is located symmetrically between the two sensors 120a, 120b, or 120c, 120d that it is located between. The barriers 150, 152 are substantially flat and planar and therefore perpendicular to each other, and both perpendicular to the support member 130. Although the sensors are not shown with significant height in FIG. 6, the centres of the sensors 120c, 120d are a certain height above the surface of the support member 130. The barriers 150, 152 extend upwards from the support member 130 to a height that is above the centres of the sensors 120c, 120d, or 120a, 120b.

Referring to FIG. 7, in a further embodiment, the barrier 150 is orientated so as not to be perpendicular to the line between the two centre points of the sensors 120a, 120c that it separates.

Referring to FIG. 8, in a further embodiment, each of the barriers 150, 152 of FIG. 6 is replaced by a pair of barriers 160, 162. The two barriers 160, 162 on each side are parallel to each other, but in offset planes, and perpendicular to the two barriers on the other side of the support member. There is a gap 163 between each pair of barriers, but this does not leave open a straight line path between the centre points of the two sensors 164a, 164c that they separate.

In one implementation, one or both of the barriers 160 and 162 may be constructed from electronic components, for example capacitors such as electrolytic capacitors. DC-blocking capacitors are required to couple electronic signals from MEMS or electret microphone capsules and advantageously should be located close to the drive voltage pin (Vdd) of the capsule. This makes use of deliberately locating the capacitors around the microphone capsule as shown in FIG. 8, or in a different location, to form the barrier producing the acoustic effect described above.

Referring to FIG. 9, in a further embodiment the flat barrier 150 of FIG. 7 is replaced by a barrier 170 having two mutually perpendicular surfaces 170a, 170b facing each of the sensors 174a, 174c. The surfaces 170a, 170b are again all perpendicular to the surfaces of the support member on which sensors 174a, 174c are mounted. Therefore each sensor 174a, 174c is located in a cavity defined by three mutually perpendicular surfaces.

Figure 10:
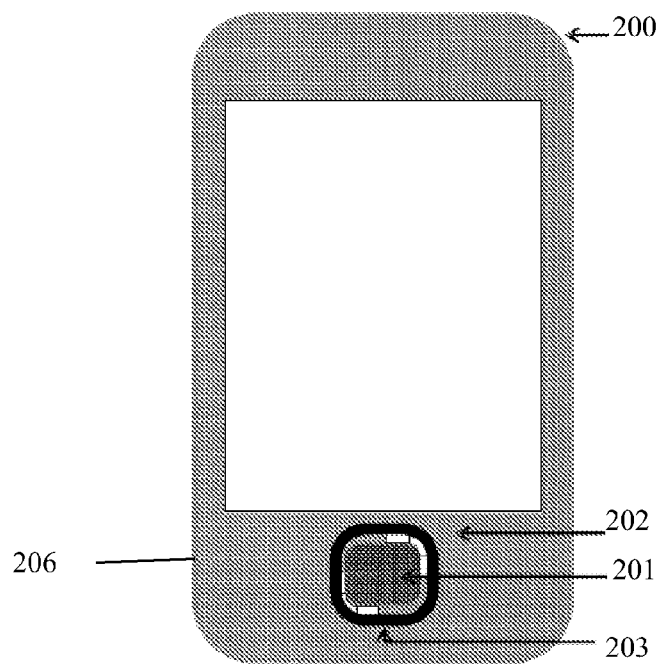
FIG. 10 is a front view of a phone unit including a microphone array according to a fifth embodiment of the invention.
Figure 11:
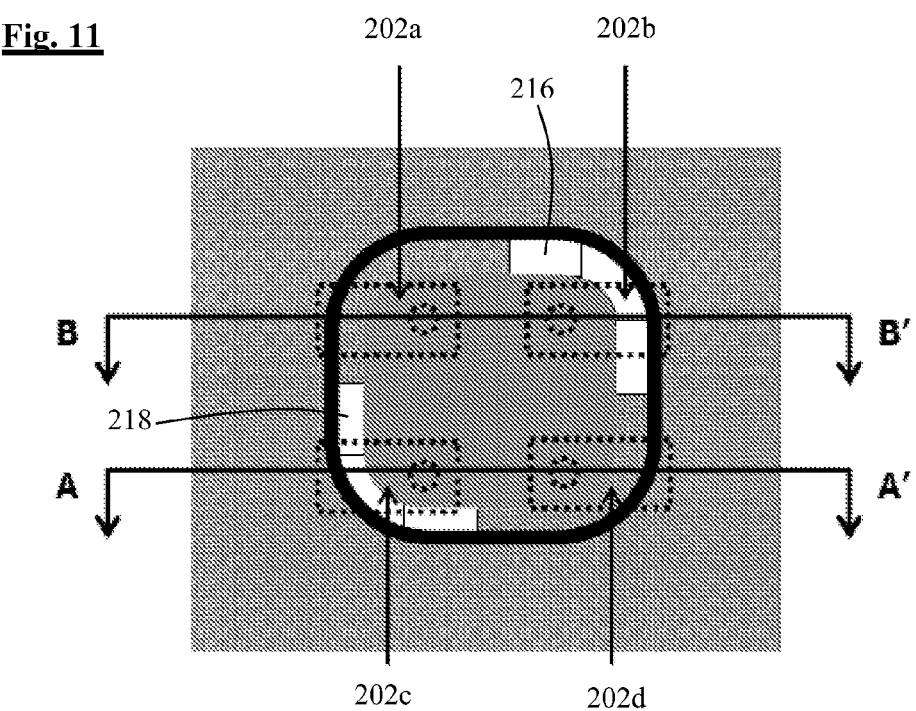
FIG. 11 is an enlargement of part of FIG. 10.
Figure 10A:
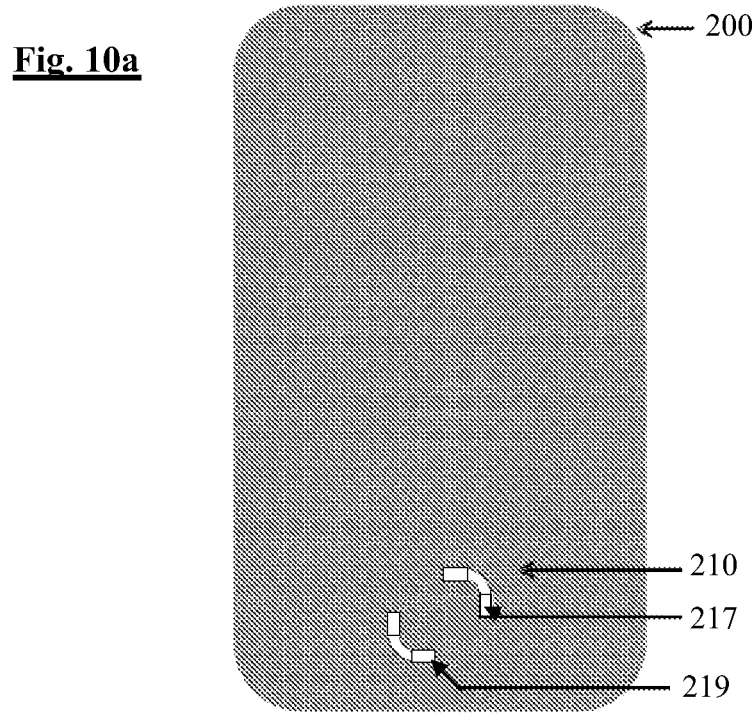
FIG. 10a is a rear view of the phone of FIG. 10.
Figure 11A:
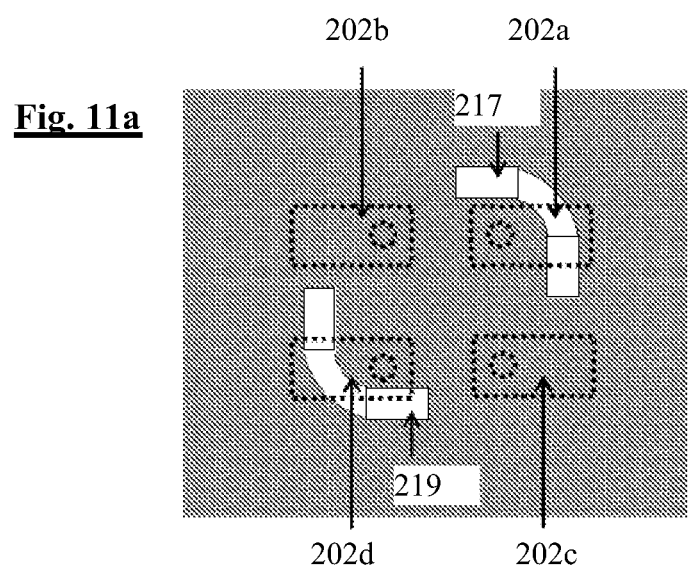
Figures 12A, 12B:
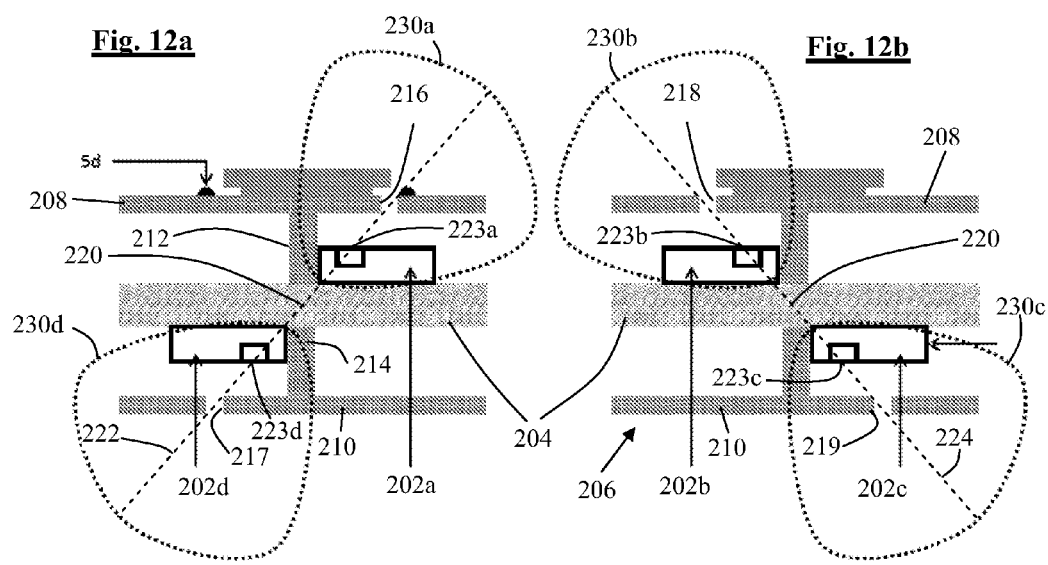
FIGS. 12a and 12b are sections on lines A-A and B-B of FIG. 11.

Referring to FIGS. 10 and 11, in a further embodiment of the invention, a mobile phone 200 includes a sound reception system comprising a processor (not shown) on the phone, a deformable button 201, and a microphone array comprising four microphones 202a, 202b mounted on a support member 204, as described above with reference to FIG. 5, and as shown in more detail in FIGS. 11, 12a and 12b. The phone also comprises a casing or housing 206, having front and rear walls 208, 210 which are parallel to each other, and parallel to the support member 204, which is in the form of a printed circuit board (PCB) with the microphones 202a, 202b, the processor not shown, and other electronic components mounted on it. The microphone array 202 is located within the housing 206 between the front and rear walls 208, 210, with the push button 201 extending over it and a bezel 203 around it. The barriers 212, 214 in this case are formed as part of the housing 206, and project inwards from the front and rear walls 208, 210 respectively with their inner ends contacting the support member 204. Each the front and rear walls has two apertures 216, 217, 218, 219 through it, one on each side of the barrier 212, 214. The apertures 216, 218 in the front wall 208 each have side walls that are perpendicular to the parallel surfaces of the front wall 208, and are in the form of elongate curved slots that form diagonally opposite quarters of a rounded square. As shown in FIG. 11a, the two apertures 217, 219 in the rear wall 210 are the same size and shape, and located so that, viewed from the front as in FIG. 11, they form the remaining two quarters of the same rounded square. Each of the apertures is closest to a respective one of the microphones 202a, 202b, 202c, 202d, and the apertures are each the same distance from the respective microphones. The exact shape and location of the apertures can vary, and the depth of the air gap between each microphone and its respective opening, to attain the necessary microphone directivity of each microphone and thereby overall microphone array performance. In some embodiments, the fact that the four apertures are the same shape as each other and symmetrically arranged with respect to the microphone array helps to improve the performance of the system.

As can be seen in FIGS. 12a and 12b, the centre point 220 of the microphone array, about which the four microphones are symmetrically arranged and from which they are equidistant, is located in the middle of the support member 204 and in the centre plane of the barriers 212, 214. One line 222, passing through that centre point, and through the centre points 223a, 223d of two of the microphones 202a, 202d, also extends through two of the apertures 216, 217, and another line 224, passing through that centre point, and through the centre points 223b, 223c of two of the other two microphones 202b, 202c, also extends through the other two of the apertures 218, 219. Here, passing through the aperture only requires that, for each aperture, the line passes through the volume bounded by the side walls of the aperture and the planes of the parallel surfaces of the wall 208, 210 of the housing.

The sensitivity of each of the microphones 202a, 202b, 202c, 202d is shown in FIGS. 12a and 12b as the dotted lines 230a, 230b, 230c, 230d. Specifically the distance of the line in any direction from the sensing centre point of the sensor 223a, 223b, 223c, 223d indicates the sensitivity of the microphone in that direction, resulting from the support and the barrier and other objects present. The sensitivity in a direction here is the inverse of the attenuation of sound coming from that direction. Therefore it can be seen that the attenuation in the ('preferred') direction away from the array centre point, in this case through the aperture 216, 217, 218, 219, is significantly less that the attenuation in the perpendicular direction. It is preferable for the attenuation to be at least 1 dB lower in the preferred direction than in any perpendicular direction, and more preferable for it to be at least 2 dB lower, or even 3 dB lower.

Figure 13A:
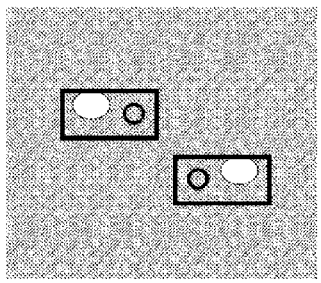
FIGS. 13a, 13b, 13c, 13d, 13e, 13f show modifications to the embodiment of FIG. 10 with different shaped apertures in the phone casing.
Figure 13B:
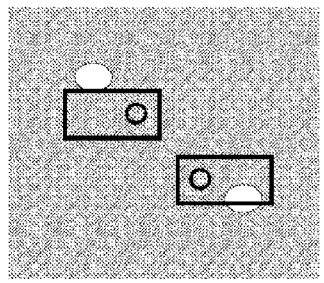
Figure 13C:
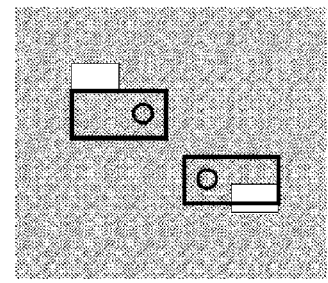
Figure 13D:
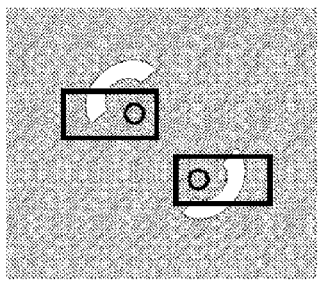
Figure 13E:
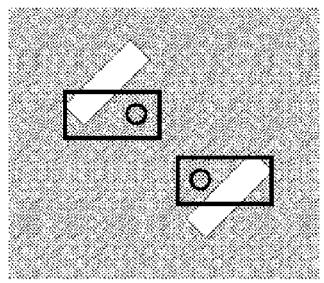
Figure 13F:
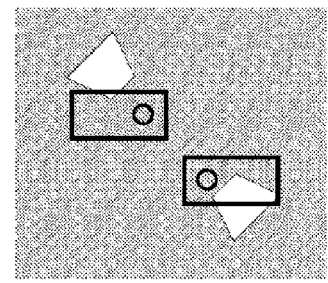

Referring to FIGS. 13a to 13f, in various other embodiments, the basic arrangement of the system is as shown in FIGS. 12a and 12b, but the shape of the apertures is different. In the embodiment of FIG. 13a, the apertures are a simple oval shape, and offset slightly from the equivalent of lines 222 and 224. In the embodiment of FIG. 13b, the apertures are again of a simple oval shape, but again located on the equivalents of the lines 222, 224. In the embodiment of FIG. 13c, the apertures are rectangular and, though located on the equivalent of the lines 222, 224, are not orientated so as to be aligned with them. In the embodiments of FIGS. 13d, e and f, the apertures are of various different shapes and all orientated so as to be aligned with the equivalent of the lines 222, 224.

Figure 14:
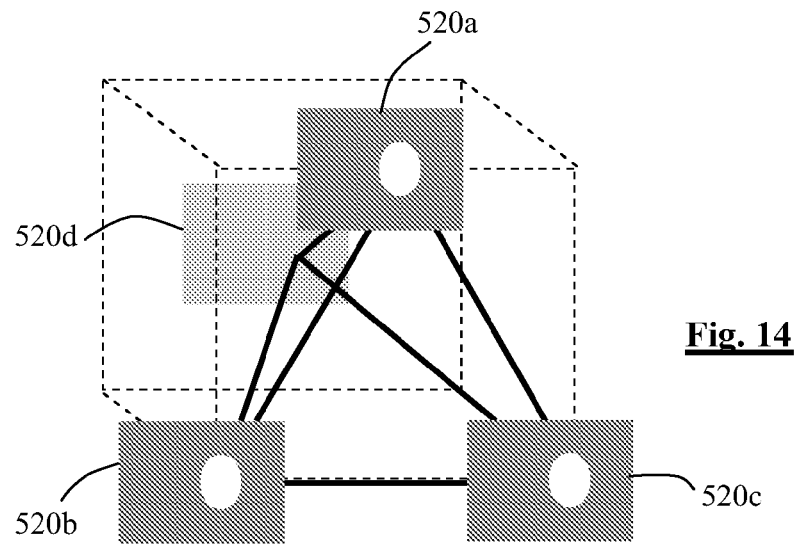
FIG. 14 is a schematic view of a microphone array according to a further embodiment of the invention.

Referring to FIG. 14, a microphone array forming part of a system of a further embodiment of the invention comprises four microphones 520a, 520b, 520c, 520d, again spaced so that the centre point of each of them is equidistant from the centre points of the three others. However, in this case a group of three of the microphones 520a, 520b, 520c all face in the same direction, and the one remaining microphone 520d faces in the opposite direction. The group of three microphones 520a, 520b, 520c, lie in a common plane, and the direction in which they face is perpendicular to that plane, and generally away from the other, fourth, microphone 520d. The fourth microphone 520d faces away from the common plane of the other three 520a, 520b, 520c.

Figure 15:
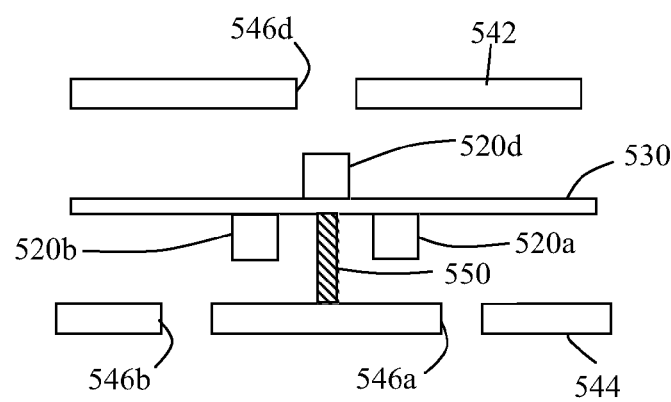
FIG. 15 is a schematic side view the array of FIG. 14.
Figure 16:
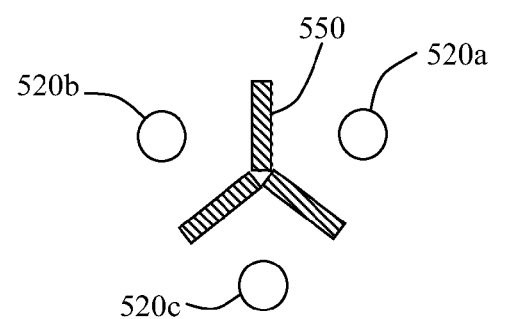
FIG. 16 is a schematic plan view of the array of FIG. 14.

Referring to FIG. 15, the array of FIG. 14 is constructed in a similar manner to that of FIG. 5, except that three of the microphones 520a, 520b, 520c are mounted on one surface of the support member 530, and the other microphone 520d is mounted on the opposite surface of the support member 530. The array is mounted on a phone housing 540 having front and rear walls 542, 544, and an aperture 546a, 546b, 546c, 546d is provided in the housing 540 for each microphone. As in other embodiments, each of the apertures is closest to, and aligned with, a respective on of the microphones. In this case, this requires three apertures in the rear wall 544, each equidistant from the other two, and further apart than the microphones themselves, and one in the front wall 542 directly above the microphone 546d. A barrier 550 is provided between each pair of adjacent microphones in the group of three that are on the rear side of the array. As can best be seen in FIG. 16, each of these three barriers is arranged perpendicular to the line between the sensing centre points of the two microphones that it separates, and equidistant from those two centre points.

Referring to FIG. 17, which shows a side projection of an array similar to that of FIGS. 12a and 12b, the four microphones 620a, 620b, 620c, 620d are mounted on opposite sides of the support member 630, and the two microphones on each side of the support member are separated by a barrier 650, and apertures 646a, 646b, 646c, 646d are provided in the housing, one for each microphone. The dotted lines show the directionality of the microphones.

Referring to FIG. 18, in a further embodiment, the barriers 750 are formed by a solid block of material in which the microphones 720a, 720b, 720c, 720d are embedded, and the apertures are formed as channels 746a, 746b, 746c, 746d formed within the block of material. In this case, the channels are of equal length to each other, and each extend, from the microphone centre point, along the line equivalent to the lines 222, 224 through the array centre point.

The embodiment of FIG. 19 is similar to that of FIG. 17, but the walls of the phone housing to not extend over the array of microphones 820*a*, 820*b*, 820*c*, 820*d*, so there are not separate apertures for each of the microphones. However, the barriers 850 are present to provide the symmetry of response.

In the embodiment of FIG. 20, as in FIG. 18, the microphones 920*a*, 920*b*, 920*c*, 920*d* are again embedded in a block of material which forms the barriers 50, and in this case there are two channels extending outwards through the block form each microphone centre point, one 946*a* in the direction in which the microphone is facing, and one 946*b* perpendicular to that.

The skilled man will of course appreciate that barriers in some arrangements might produce a Helmholtz cavity, with undesirable results. However the skilled man will equally be able to avoid this occurring in a practical system.

While two barriers are shown in the examples describe, in some cases, where more limited directionality is required, one barrier may be sufficient.

Figure 21A:
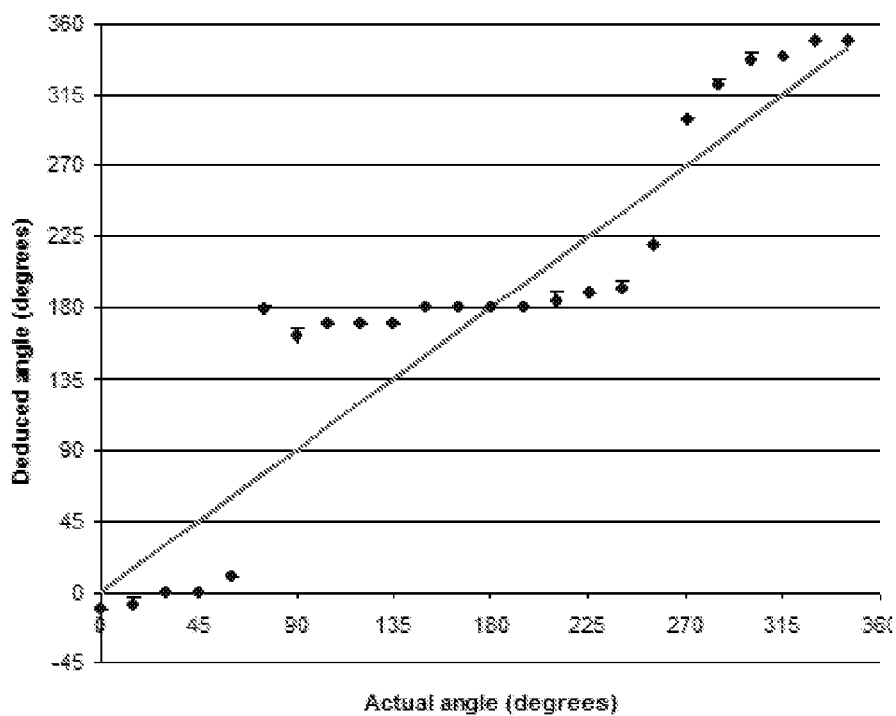
FIGS. 21a and 21b are plots showing the deduced direction (angle) of the source as a function of actual angle for a system without barriers and the same system with barriers.
Figure 21B:
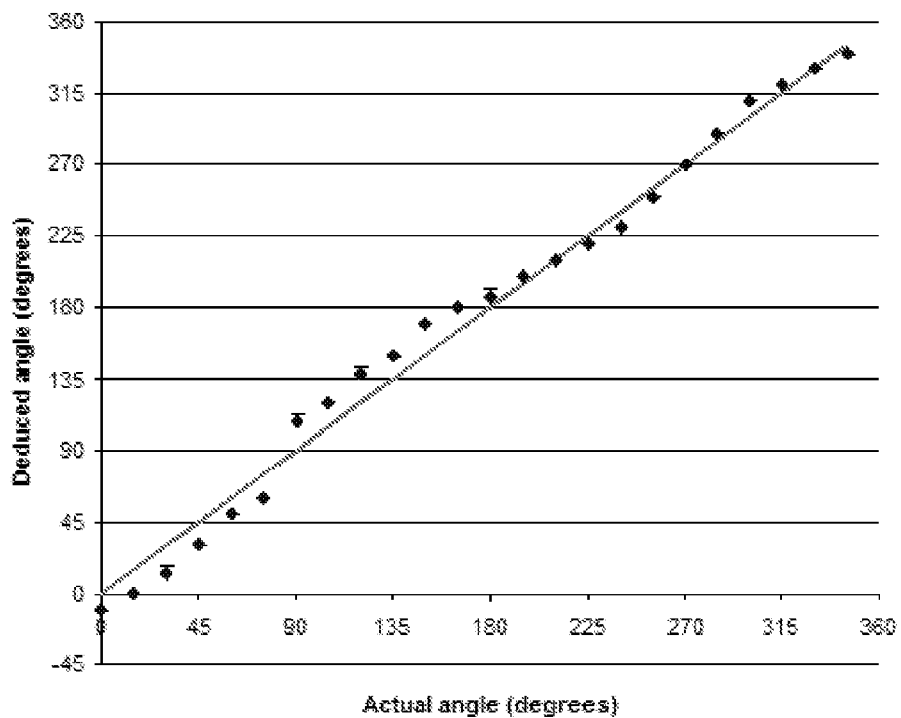

Referring to FIGS. 21*a* and 21*b*, in an experiment a microphone array arranged as in FIG. 8 was used, in a system as described with reference to FIG. 1, firstly without any barriers between the microphones, and then with the barriers 161, 162 formed from plastic 4 mm in height above the PCB. The results for the setup without the barriers are shown in FIG. 21*a*, and it can be seen that the system was unable to distinguish clearly directions around 90° and 270°, ie close to the plane of the PCB. With the barriers inserted, the results were as shown in FIG. 21*b*, and it can be seen that the ability of the system to accurately distinguish between sounds from angles around 90° and 270° is greatly improved. As can be seen, in this case the error in the measured angle, i.e. the angle between the measured direction and the true direction of the source, is nowhere more than 30°. This Referring to FIGS. 22*a* and 22*b*, in a microphone array according to a further embodiment of the invention, a substrate 1030 has two opposite parallel surfaces, with two microphones 1020*a*, 1020*b* mounted on one and two further microphones 1020*c*, 1020*d* mounted on the other. A first barrier 1050 is provided between the first two microphones 1020*a*, 1020*b*, and a second barrier 1052 is provided between the second two microphones 1020*c*, 1020*d*. In this embodiment the two barriers are parallel to each other. As described above, and as is the case in the embodiments described above, the barriers 1052, 1054 are arranged so that, for any given frequency of sound, they have the same attenuation effect as the substrate 1030. This means that, if the sound is travelling across the face of the substrate 1030, the pressure difference p1–p2 between the two microphones 1020*a*, 1020*b* on one side of the substrate, is the same as the pressure difference p1–p3 between two of the microphones 1020*a*, 1020*c*, on opposite sides of the substrate when the sound is travelling perpendicular to the plane of the substrate, i.e. through the substrate. In terms of pressure ratios, this means that p2/p1=p3/p1 for the transverse and perpendicular cases of FIGS. 22*a* and 22*b* respectively.

In the arrangement of FIGS. 22*a* and 22*b*, it is the combination of equal spacing of the microphones and the equal attenuation of sound in the two perpendicular directions parallel and perpendicular to the plane of the substrate that makes the array respond in a symmetrical manner to sounds coming from all directions. However, rather than using a barrier to increase the attenuation in the direction parallel to the substrate, it is also possible to use the spacing of the microphones to achieve this. For example, referring to FIGS. 23*a* and 23*b*, in a further embodiment of the invention, the substrate 1130 has two opposite parallel surfaces, with two microphones 1120*a*, 1120*b* mounted on one and two further microphones 1120*c*, 1120*d* mounted on the other. In this case the distance between the two microphones 1120*a*, 1120*b* on one side of the substrate is the same as the distance between the two microphones 1120*c*, 1120*d* on the other side, and when seen in front view, i.e. looking perpendicular to the plane of the substrate, as in FIG. 23*a*, the four microphones are seen to form a square. The four microphones are therefore at four non-adjacent corners of a rectangular cuboid with two square faces parallel to the surfaces of the substrate 130. The spacing $L_{31}$ between the microphones in the direction perpendicular to the plane of the substrate, which is the length of the shortest sides of the rectangular cuboid, is less than the shortest spacing $L_{21}$ between the microphones in two directions parallel to the plane of the substrate, which is the length of the longer sides of the rectangular cuboid.

Where the substrate is a truly planar sheet material, directions perpendicular to, and parallel to, the plane of the substrate will be clearly defined. For less regular support members, in order to clearly define the directions parallel to, and perpendicular to, the plane of the substrate, or support member, that plane can be considered to be a geometrical plane 1121 which is parallel to the line between the sensing centre points of the two sensors 1120*a*, 1120*b* on one side of the substrate, and parallel to the line between the sensing centre points of the two sensors 1120*c*, 1120*d* on the opposite side of the substrate, and equidistant from those two lines.

For the purpose of explanation it can be assumed that the sound pressure varies with distance as it travels between two microphones m1 and m2 according to the formula:

$$p2/p1 = \exp(-\alpha L_{21} - \beta_{21}) \text{ and } p3/p1 = \exp(-\alpha L_{31} - \beta_{31})$$

where:
$\alpha$ is the natural rate of sound pressure decline in free space with no impediments;
$L_{21}$ is the physical separation between the two microphones m1 and m2 in the direction of the pressure wave travel;
$\beta_{21}$ is the pressure wave attenuation presented by the barrier placed between m1 and m2.

This is an approximation which is valid over short distances.

For the embodiments where the microphones are all equidistant from each other at the corners of a cube, $$L_{21} = L_{31} = L, \text{ and so}$$

$$p2/p1 = \exp(-\alpha L_{21} - \beta_{21}) = \exp(-\alpha L - \beta_{21}), \text{ and}$$

$$p3/p1 = \exp(-\alpha L_{31} - \beta_{31}) = \exp(-\alpha L - \beta_{31})$$

where L is the length of the side of the cube.

Then to achieve p2/p1=p3/p1, i.e. to get equal attenuation for both transverse and perpendicular sound directions, it is necessary to achieve $\beta_{21} = \beta_{31}$. This can be achieved by matching the barrier to the substrate in the embodiments described above.

However, the same effect can be achieved by varying $L_{21}$ and $L_{31}$ i.e. be altering the spacing of the microphones.

In the case shown in FIGS. 23*a* and 23*b*, $L_{21}$ and $L_{31}$ are chosen such that:

$$p2/p1_{trans} = p3/p1_{perp}$$

Where $p2/p1_{trans}$ is the ratio of the pressures at microphones on the same side of the substrate when the sound is travelling transverse to, or parallel to, the surface of the substrate, and p3/p1$_{perp}$ is the ratio of the pressures at microphones on opposite sides of the substrate when the sound is travelling perpendicular to the surface of the substrate, and therefore $$\exp(-\alpha L_{21}-\beta_{21})=\exp(-\alpha L_{31}-\beta_{31}).$$

This means that the rotational symmetry of the response of the microphone array can be improved by physically separating the microphones such that the combined effect of the separation distance between them, and any physical barriers between them, is the same for sound travelling perpendicular and parallel to the plane of the substrate.

Where no barriers are provided between the microphones on the same side of the substrate, and only the spacing of the microphones can be adjusted, the symmetry is achieved by making $$\alpha L_{21}=\alpha L_{31}+\beta_{31}$$

Referring to FIGS. 23a and 23b, it will be appreciated that the microphone spacing of that embodiment is well suited to use in a mobile telecommunications device. Such devices are usually relatively thin, having two large parallel surfaces forming the front and back of the device with a screen on the front surface. The microphone array of FIGS. 23a and 23b can be housed within such a telecommunications device with the substrate parallel to, and between, the front and back surfaces, so that two of the microphones 1120a, 1120b are under the front surface, between the front surface and the substrate, and the other two microphones 1120c, 1120d are under the rear surface, between the rear surface and the substrate. As with the embodiments described above, the substrate, or support member, can comprise the PCB carrying the other electronic components of the device. In this arrangement the spacing between the front two microphones 1120a, 1120b can be at least 100% greater than the spacing between the front and rear It will be appreciated that each of the different physical arrangements of sensors described above can be used with any of the processing methods described above with reference to equations (1) to (13).

The systems described above are arranged for source separation, i.e. to identify the components of a sound mixture coming from each of a plurality of sources in different locations. However it will be appreciated that in other embodiments the systems can be arranged to identify components of sound from just a single direction. This can be useful in directional listening devices.

The invention claimed is:

1. A system for directionally selective sound reception comprising an array of pressure sensors each arranged to output a pressure signal indicative of pressure, and a processor arranged to receive the pressure signals, to derive from the pressure signals a series of sample values of directional pressure gradient, to identify a plurality of frequency components of the pressure signals, to identify at least one source direction, and to identify at least one of the components as coming from the source direction, the sensor array comprising a support supporting the four sensors and having a first side and a second side opposite to the first side, a first one and a second one of the sensors being mounted on the first side of the support and at least a third one of the sensors being supported on the second side of the support wherein when the sound arrives at the array from a direction parallel to the support, the sound pressure difference caused, measured between the first sensor and the second sensor, will be dependent on the distance between the first and second sensors and the nature of material in the space between the first and second sensors, when sound arrives at the array travelling perpendicular to the support the sound pressure difference caused, measured between the first and third sensors, will be dependent on the distance between the first and third sensors and the nature of material in the space between the first and third sensors, and the spacings and the materials are selected such that, for sounds at one of 1000 Hz and 256 Hz, one of the sound pressure differences is no more than 50% higher than the other.

2. A system according to claim 1 wherein one of the sound pressure differences is no more than 5% higher than the other.

3. A system according to claim 1 wherein the first and second pressure sensors are separated by a first distance, and the first and third pressure sensors are separated by a second distance, and the first distance is greater than the second distance.

4. A system according to claim 1 further comprising a barrier which is provided between the first and second pressure sensors.

5. A system for directionally selective sound reception comprising a sensor array, the sensor array comprising four pressure sensors each of the pressure sensors being arranged to output a pressure signal indicative of pressure, and a processor arranged to receive the pressure signals, to derive from the presure signals a series of sample values of directional pressure gradient, to identify a plurality of frequency components of the pressure signals, to identify at least one source direction, and to identify at least one of the components as coming from the source direction, the sensor array further comprising a support supporting the four sensors, the support having first and second sides which are opposite to each other and one of which lies in a plane, a first one and a second one of the sensors being mounted on the first side of the support and separated from each other by a first distance in a direction parallel to said plane, and at least a third one of the sensors being supported on the second side of the support and separated from the first one of the sensors by a second distance in a direction perpendicular to said plane, wherein the first distance is greater than the second distance.

6. A system according to claim 5 wherein the support is substantially planar, and the first and second sides of the support are parallel to each other, the fourth one of the sensors is mounted on said second side of the support and the second and third sensors are separated from each other by a third distance which is the same as the first distance.

7. A system according to claim 5 wherein each of the pressure sensors has a sensing centre point, and the sensing centre points of the four sensors are arranged at the non-adjacent corners of an imaginary rectangular cuboid.

8. A system according to claim 7 wherein each of the pressure sensors comprises a diaphragm and the sensing centre of each pressure sensor is the geometrical centre of the respective diaphragm.

9. A system according to claim 5 wherein the first and second pressure sensors face in a first direction, and the third and fourth sensors face in a second direction which is opposite to said first direction.

10. A system for directionally selective sound reception comprising an array of pressure sensors each arranged to output a pressure signal indicative of pressure, and a processor arranged to receive the pressure signals, to derive from the pressure signals a series of sample values of directional pressure gradient, to identify a plurality of frequency components of the pressure signals, to identify at least one source direction, and to identify at least one of the components as coming from the source direction, the sensor array comprising a support having two opposite sides and four sensors, at least two of the sensors being supported on one side of the support, and a barrier located between said two of the sensors.

11. A system according to claim 8 wherein the diaphragms of all four sensors are parallel to each other.

12. A system for directionally selective sound reception comprising a sensor array, the sensor array comprising four pressure sensors each arranged to output a pressure signal indicative of pressure, and a processor arranged to receive the pressure signals, to derive from the pressure signals a series of sample values of directional pressure gradient, to identify a plurality of frequency components of the pressure signals, to identify at least one source direction, and to identify at least one of the components as coming from the source direction, the sensor array further comprising a support, and the four sensors being supported on the support, at least two of sensors being orientated parallel to each other, the sensors being arranged to sense pressure at respective sensing points, the sensor array having a central point, the sensing points being equidistant from each other and from the central point, and an enclosure extending around the sensor array and defining four apertures each being associated with a respective one of the sensors, wherein the apertures are arranged such that each of them lies on a line extending out from the central point through a respective one of the sensing points.

13. A system according to claim 12 wherein two of the pressure sensors face in a first direction, and two of the pressure sensors face in a second direction which is opposite to the first direction.

14. A system according to claim 1 wherein three of the sensors face in a first direction and one of the sensors faces in a second direction which is opposite to the first direction.

15. A system according to claim 10 wherein the support comprises a flat member having two surfaces, one on each side of said sides of the member.

16. A system according to claim 10 further comprising an electrical component, wherein the barrier is at least partly formed by the electrical component.

17. A system according to claim 10 wherein each of the pressure sensors has a sensing centre point at which it senses pressure, and a part of the barrier is located on a straight line between the sensing centre points of two of the sensors.

* * * * *